United States Patent Office 3,472,561
Patented Oct. 14, 1969

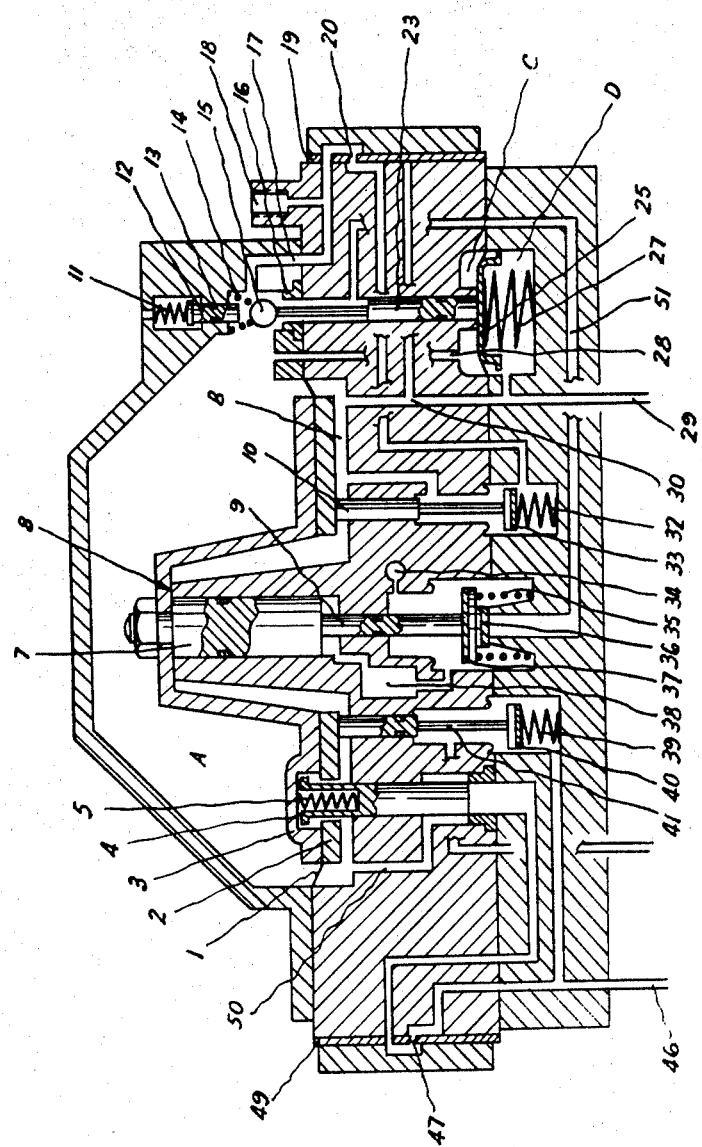

3,472,561
FLUID PRESSURE BRAKE CONTROL VALVE
Jack Washbourn, Malmesbury, England, assignor, by mesne assignments, to Westinghouse Air Brake Company, Pittsburgh, Pa.
Filed Jan. 3, 1968, Ser. No. 695,401
Int. Cl. B60t *11/34, 17/06*
U.S. Cl. 303—33                                          4 Claims

ABSTRACT OF THE DISCLOSURE

A direct release control valve for air brakes in which a service reduction in brake pipe pressure relative to auxiliary reservoir pressure effects a piston operation which exhausts a brake cylinder and controls a quick service valve means which moves with the piston to communicate the brake pipe to a vented quick service chamber to effect further reduction in brake pipe pressure for quick service operation, and shortly thereafter closes the vent, and in which an interlock valve device responds to an increase in brake pipe pressure relative to auxiliary reservoir pressure during recharging of the brake pipe to sever communication of the brake pipe with the quick service chamber so that the quick service chamber may be vented by reverse operation of the quick service valve and to provide rapid brake release control operation of the piston means.

BACKGROUND OF INVENTION

Heretofore, control valve means of the present type, otherwise known as triple valves, have a main pile which controls the operation of several valves, and it is essential that these valves operate in a definite sequence, for example, as described in Australian Patent No. 253,540.

As is well known, to apply the brake in such a system, the brake pipe pressure is reduced and this causes the pile of the triple valve to move upwardly. To prevent excessive back flow of air from the auxiliary reservoir, the first valve function to occur as a result of pile rise is the closure of the auxiliary reservoir charging valve. Next in the upward movement is the closure of the brake cylinder exhaust valve and then the closure of the quick serviced bulb exhaust valve. It is only when these functions have occurred that the quick service inlet valve opens and quick service occurs.

The result of this sequence is that a considerable movement of parts must take place before quick service occurs and thus there is a delay and also an increase in pressure in the brake pipe caused by diaphragm displacement. Both of these factors cause a reduction in the speed of propagation of the brake application down the train.

SUMMARY OF THE INVENTION

The object of the present invention is to overcome the stated disability in a simple manner.

The invention consists in a direct release triple valve of the type in which, when the brake pipe pressure is reduced by a predetermined amount, a connection is made, by means of a quick service valve, between the brake pipe and a vented capacity; characterized by the inclusion in or association with the triple valve of an interlock valve whereby the said connection is made before the connection between the capacity and atmosphere is cut off, and before the valve controlling the charging of the auxiliary reservoir is closed.

The interlock valve, is included in the connection between the brake pipe and the quick service valve; it closes off the connection when the brake pipe pressure exceeds the pressure in the auxiliary reservoir by a predetermined amount. This amount is less than the amount required to move the triple valve to release position.

The interlock valve is controlled by the difference in pressure between the brake pipe and the auxiliary reservoir and the load due to first loading spring.

The interlock valve is also loaded by a further loading spring to hold it in closed position until the brake pipe pressure exceeds a predetermined amount, upon which the further loading spring becomes ineffective.

An example of the invention is illustrated diagrammatically, in the single figure of drawings herewith, by way of a cross-sectional view of a triple valve.

The main pile includes a diaphragm 1, and diaphragm followers 2 and 3, fixed on a stem 7. This stem 7 controls the position of a valve rod 9. The followers control the positions of plunger stems 4, 10 and 41.

Rod 9 operates the quick service inlet and exhaust valve 36; stem 4 forms part of the brake cylinder inlet valve; stem 10 operates the auxiliary reservoir charging valve 33; and stem 41 the brake cylinder exhaust valve 40.

A diaphragm 25 spring loaded upwardly by first loading spring 27, controls (through stem 23) an interlock valve 15, spring loaded towards its seat 16, by second loading spring 14. Above the interlock valve and spring loaded towards it by spring 11, is stem 12, sealed by O-ring 13 and subject to brake pipe pressure acting against atmospheric pressure.

The chamber A above diaphragm 1 is connected to the brake pipe via passage 17 and union socket 18.

The chamber B below diaphragm 1, is connected to the auxiliary reservoir by passage 30, and connection 29.

The chamber C above the interlock diaphragm 25, is connected to chamber A, and hence to the brake pipe, via passage 28; the chamber D under diaphragm 25 is connected to the chamber B, and hence to the auxiliary reservoir, via passage 30.

In release position, with the brake pipe and the auxiliary reservoir charged, the triple valve is as shown in the drawing.

The quick service inlet valve 36 is on its seat, as is the brake cylinder inlet valve 4.

The brake cylinder exhaust valve 40, is open as is the charging valve 33, the quick service exhaust valve 37 and the interlock valve 15.

The diaphragm follower 3 is against the stop face 8 on the triple valve body.

OPERATION OF THE INVENTION

The operation of the triple valve is as follows:

The release position of the brake pipe pressure acting in chamber A produces a downward force sufficient to overcome the upward force of springs 35, 32, 39 and 5. Also the upward force of brake pipe pressure acting on the quick service inlet valve 36.

If now the brake pipe pressure is reduced, a pressure difference is established across the diaphragm 1 because auxiliary reservoir pressure cannot flow back freely; such flow can only take place through choke 20.

When the brake pipe pressure has fallen by a predetermined amount, say 1 p.s.i., the pile will commence to move upwardly and immediately air will flow from the brake pipe via connection 18, passage 17, open valve 15, passage 51, open valve 36, to the quick service bulb 38.

This produces a rapid drop in the brake pipe pressure, and the pile will move rapidly upwards, allowing the brake cylinder exhaust valve 40, the charging valve 33 and the quick service exhaust valve 37 to close. During this movement, brake pipe air can flow through the open quick service inlet valve and open quick service exhaust valve 37, to atmosphere via vent 34. However, the time interval for this movement is so short that very little brake pipe air flows to atmosphere, and the little that does do so provides useful assistance to the bulb in lowering the brake pipe pressure the required amount.

After the quick service exhaust valve 37 closes, further movement opens the brake cylinder inlet valve 4 and connects the auxiliary reservoir to the brake cylinder via passage 50, open valve 4, choke 47 in choke plate 49 and connection 46. In well-known manner, air flows to the brake cylinder until the pressure in the auxiliary reservoir falls to that in the brake pipe, whereupon the pile moves down to close off the brake cylinder inlet valve. The application can be augmented in stages by making further reductions in the brake pipe pressure. During all this time the interlock valve 15 stays open and there is a free connection between the brake pipe and the bulb 38 via connection 18, passage 17, open valve 15, passage 51 and open valve 36.

If the pile moves past the point where the brake cylinder inlet valve is closed, it comes against the resistance of the bulb exhaust valve 37, this valve being subject to the pressure in the bulb 38, against atmospheric pressure on the top of the valve.

To release the brake, the brake pipe pressure is increased. As soon as the pressure is increased a small amount, the increased pressure acting on the interlock diaphragm 25, over the auxiliary reservoir pressure acting in chamber D on the underside of the diaphragm 25 causes the diaphragm to move down, and spring 14 closes the interlock valve 15. The connection between the brake pipe and the bulb 38 is thus cut off.

When the brake pipe pressure has been increased by a further predetermined amount, the resistance of the bulb exhaust valve 37 is overcome. The pressure in the bulb 38 then flows rapidly to atmosphere via vent 34 and the pressure difference across the bulb exhaust valve is destroyed, also the pressure under the stem 7 is lost. The combination of these two factors results in a sudden increase in the downward force on the pile. The pile, therefore, moves rapidly to the release position, but while it is doing this there is a time when the bulb exhaust valve 37 and the bulb inlet valve 36 are open at the same time. However, the interlock valve has previously closed and there can be no flow of air from the brake pipe to atmosphere during release via the open bulb inlet valve 36 and the open bulb exhaust valve 37.

Once the resistance of bulb exhaust valve 37 has been overcome, the pile moves fully to releases the opening the brake cylinder exhaust valve and the charging valve 33 and finally closing the bulb inlet valve 36. Once the brake pipe pressure and the auxiliary reservoir pressure have substantially equallized, the interlock valve 15 reopens. However, if an application be made while recharging and with the interlock valve closed, the interlock valve will reopen as soon as the brake pipe pressure fails below that in the auxiliary reservoir; that is, before the quick service inlet valve opens and thus quick service can take place.

Considering now the function of the interlock valve 15 during initial charging:

With no pressure in the system, the diaphragm pile is held up by the quick service inlet valve spring 35 with the quick service exhaust valve 37 closed. Plunger stem 12 above the interlock valve is moved down by the spring 11 and holds the interlock valve 15 closed. The combined effect of springs 11 and 14 is greater than the upward force of spring 27.

As pressure builds up in the brake pipe, the pile will be moved down, opening the quick service exhaust valve and then the charging valve 33 and the brake cylinder exhaust valve 40. As a pressure difference will exist between the brake pipe and the auxiliary reservoir, the interlock valve diaphragm 25 will be moved down; but the interlock valve is already held closed by the spring 11, acting on plunger 12.

At a certain point in the charging up, the pressure in the brake pipe is sufficient, acting on the area of stem 7, to hold the pile in the release position; but before this time, if the charging is stopped and brake pipe pressure equalizes with auxiliary reservoir pressure, the interlock valve would tend to open. This would cause quick service, but this cannot occur as the spring 11 acting on plunger 12 still holds the interlock valve 15 closed. As charging of the brake pipe continues the brake pipe pressure overcomes the spring 11 by acting on the plunger 12 and thus, for normal operation, the spring 11 is held inoperative and the interlock valve 15 remains open.

Even with the plunger 12 operative, it is still possible to obtain quick service, the plunger and the spring 11 serving only to desensitize the quick service function during the initial part of brake pipe charging. Thus the triple valve is not so likely to be affected by the fluctuations that occur during the charging of the system.

Having now described the invention, what I claim as new and desire to secure by Letters Patent is:

1. A direct release control valve device for controlling application and release of air brakes in response to pressure in a brake pipe; comprising:

(a) auxiliary reservoir charging valve means operable when open to communicate a brake pipe with an auxiliary reservoir;

(b) brake cylinder inlet valve means operable when open to communicate said auxiliary reservoir to pressurize a brake cylinder means;

(c) brake cylinder exhaust valve means operable when open to communicate said brake cylinder to exhaust;

(d) first means operable in a first mode responsive to predominating brake pipe pressure in a first chamber relative to auxiliary reservoir pressure in a second chamber to close said brake cylinder inlet valve means, and open said brake cylinder exhaust valve means and said auxiliary reservoir charging valve, and operable in a second mode responsive to a reduction in brake pipe pressure in said first chamber below the auxiliary reservoir pressure in said second chamber to close said brake cylinder exhaust valve means and said auxiliary reservoir charging valve means, and to open said brake cylinder inlet valve means;

(e) a quick service chamber having a vent to atmosphere;

(f) second means for communicating said brake pipe to said quick service chamber;

(g) said second means including a quick service supply and exhaust valve means operable through a first sequence to open said vent and sever said second means in response to said first mode of operation of said first means, and operable to reverse said sequence of operation in response to said second mode of operation of said first means;

(h) said second means further including a normally open interlock valve means operable to close in response to brake pipe pressure predominating over auxiliary reservoir pressure by a predetermined amount to sever communication between said brake pipe and said quick service chamber.

2. A direct release control valve device for controlling application and release of air brakes in response to pressure in a brake pipe, as recited in claim 1, in which additional means operate to close said interlock valve means only so long as atmospheric pressure predominates over brake pipe pressure by a predetermined amount.

3. A direct relase control valve device for controlling application and release of air brakes in response to pressure in a brake pipe, as recited in claim 1, in which said interlock valve means is operated by means including a piston subject to spring means and auxiliary reservoir pressure on one side thereof, and subject to brake pipe pressure on the other side thereof.

4. A direct release control valve device for controlling application and release of air brakes in response to pressure in a brake pipe, as recited in claim 2, in which:

(a) said additional means comprises a piston subject to spring bias and atmospheric pressure on one side thereof and subject to brake pipe pressure on the other side thereof.

References Cited
UNITED STATES PATENTS

| | | | |
|---|---|---|---|
| 2,012,375 | 8/1935 | Campbell | 303—66 |
| 2,223,113 | 11/1940 | McCune | 303—66 |
| 2,994,565 | 8/1961 | McClure et al. | 303—66 X |

DUANE A. REGER, Primary Examiner

U.S. Cl. X.R.

303—66, 81